(No Model.)  H. J. BAILEY.  2 Sheets—Sheet 1.
WATER CLOSET.

No. 327,219.  Patented Sept. 29, 1885.

Witnesses.
W. B. Corwin
Harry L. Gill.

Inventor:
Harry J. Bailey
by his attys
Bakewell & Kerr (No Model.) 2 Sheets—Sheet 2.

H. J. BAILEY.
WATER CLOSET.

No. 327,219. Patented Sept. 29, 1885.

Witnesses.
N. B. Corwin
Harry L. Gill.

Inventor:
Harry J. Bailey
by his attys
Bakewell & Kerr

UNITED STATES PATENT OFFICE.

HARRY J. BAILEY, OF PITTSBURG, PENNSYLVANIA.

WATER-CLOSET.

SPECIFICATION forming part of Letters Patent No. 327,219, dated September 29, 1885.

Application filed December 31, 1884. (No model.)

*To all whom it may concern:*

Be it known that I, HARRY J. BAILEY, of Pittsburg, in the county of Allegheny and State of Pennsylvania, have invented a new and useful Improvement in Water-Closets; and I do hereby declare the following to be a full, clear, and exact description thereof, reference being had to the accompanying two sheets of drawings, forming a part of this specification, in which—

Figure 1:
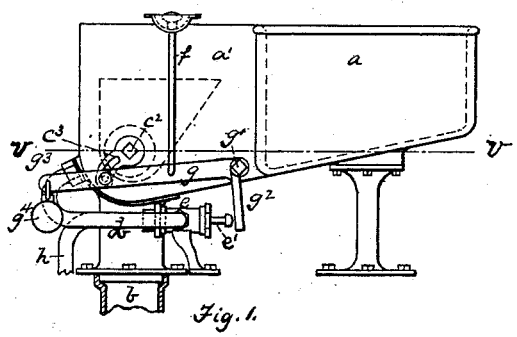
Figure 2:
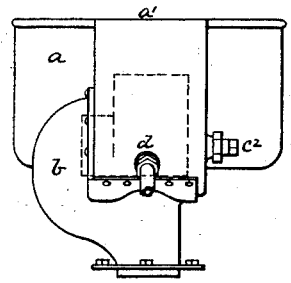
Figure 3:
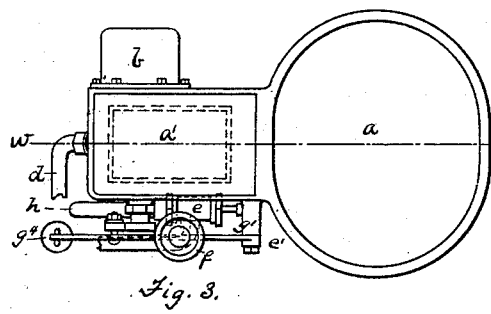
Figure 4:
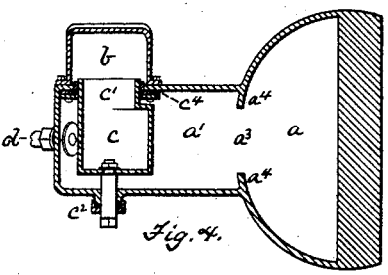
Figure 5:
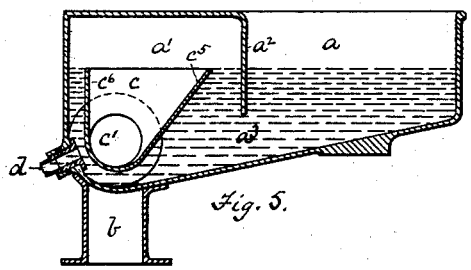
Figure 6:
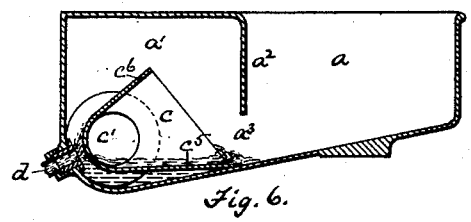
Figure 7:
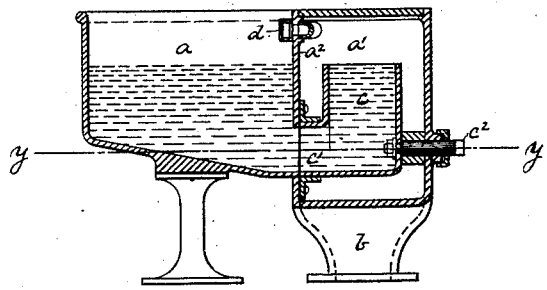
Figure 8:
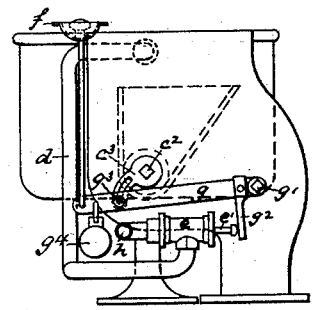
Figure 9:
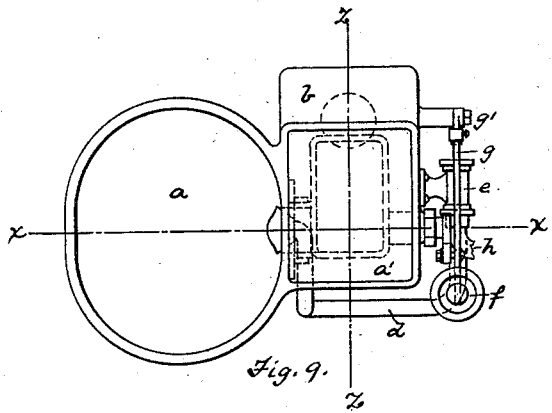
Figure 10:
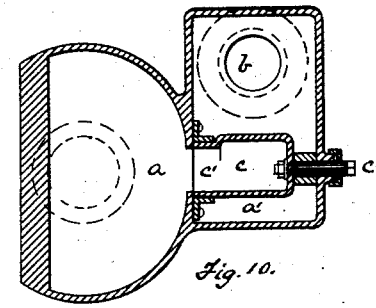
Figure 11:
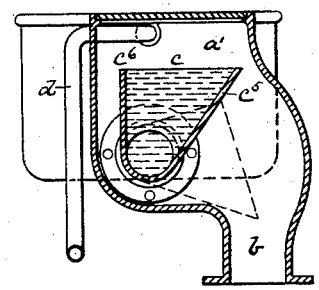

Figures 1, 2, and 3 are respectively side, end, and plan views of my improved water-closet. Fig. 4 is a horizontal section on the line $v\ v$ of Fig. 1. Figs. 5 and 6 are vertical longitudinal sections on the line $w\ w$ of Fig. 3, and illustrate the operation of my improved closet. Figs. 7 to 11 are views of a modification of my improvement, Fig. 7 being a longitudinal vertical section on the line $x\ x$ of Fig. 9; Fig. 8, an end view; Fig. 9, a plan; Fig. 10, a horizontal section on line $y\ y$ of Fig. 7, and Fig. 11 a vertical cross-section on line $z\ z$ of Fig. 9.

Like letters of reference indicate like parts in each.

My improvement relates particularly to that class of water-closets which have rotating valves, through which the contents of the bowl are discharged into the soil or sewer pipe; and it consists, mainly, of an improved construction and arrangement of the valve and in its use with a tight air-chamber, whereby an inspiratory action is obtained, by which the foul air in and about the bowl is drawn into the sewer-pipe at the time when the contents of the bowl are being discharged. As heretofore constructed and used, it has been necessary to rotate such valves through an arc of ninety degrees in order to discharge the contents of the bowl through them. These valves are made with two openings, one constituting the inlet and the other the outlet, which openings are at or nearly at right angles to each other. Either end may be used as the inlet, the other being the outlet, this depending entirely on the will of the maker. The axis of rotation extends through one of the openings, and a radius struck from said axis extends through the other. When the latter opening is turned down, the contents of the closet will run out through the valve, and when it is turned up it acts with other parts to trap the water in the closet, and cause it to form a seal to prevent the passage of foul air or sewer-gas through the bowl into the surrounding apartment. If the radial end of the valve is enlarged by extending one of its sides at a diverging angle to the opposite side, which extends at a right angle to the axis of rotation, and the valve is so arranged that the divergent side shall be the lower one when the valve is turned either on the receiving or discharging side, the amount of rotation necessary to be given to the valve will be reduced proportionately to the angle of divergence of the side of the valve—that is to say, if the angle of divergence is forty-five degrees the valve will require to be turned only forty-five degrees, instead of ninety degrees, as heretofore, and will require only half the time heretofore necessary. Thus a saving in wear and friction is effected, while the saving in time enables me to obtain the full advantage of the inspiratory action hereinafter described.

Referring now to Figs. 1 to 6, Sheet 1, my improved closet is provided with a bowl or basin, $a$, at one side of which is a closed valve-chamber, $a'$, which is partially separated from the bowl by a downwardly-projecting partition, $a^2$. The partition $a^2$ reaches a sufficient distance below the top of the valve $c$, which is contained in the chamber $a'$, to constitute a trap or seal with the water, to prevent the escape of foul air from the chamber $a'$ into the bowl $a$. Extending downward from the end of the partition $a^2$ to the bottom of the bowl are side wings or partitions, $a^4$, Fig. 4, which reduce the width of the passage $a^3$ to about that of the open mouth of the valve, so that the contents of the former may pass directly into the latter. The chamber $a'$ has an air-tight shell, so that when the water is above the end of the partition $a^2$, as in Fig. 5, the foul air, if any, in the chamber $a'$, cannot escape, and so that when the water is discharging and fills the soil-pipe a partial vacuum will be formed in the chamber, which, as soon as the water falls below the partition $a^2$, will cause any foul air in the bowl to be drawn into the chamber. Arranged in the chamber $a$ is a rotary discharge-valve, $c$, which has a hollow journal, $c'$, on one end, extending through the shell of the chamber and opening into the upper end of the soil-pipe $b$. The opposite end of the valve $c$ is provided with a solid journal, $c^2$, which extends through a stuffing-box in the shell of the chamber $a'$, and at the outer end is fitted for the reception of a crank, $c^3$, by which the valve is turned. The valve $c$ has a hopper-shaped body, which form is given to it by making one of its sides, $c^5$, inclined to the other, $c^6$, so that it diverges toward the mouth. The side $c^6$ stands at a right angle to the axis of rotation, and the valve is so arranged that the divergent side, $c^5$, is on the tipping side, and consequently it has to traverse a shorter arc before it comes to a horizontal or discharging position than if it stood at a right angle to the horizon. The degree of inclination may be varied; but the greater it is the less will be the rotation of the valve necessary to a discharge. Placed at the side of the chamber $a$ is the shell $e$ of a water-supply valve, with which the water-supply pipe $h$ is connected. The stem $e'$ of the valve projects beyond the end of the shell $e$ in the usual manner. The pipe $d$, which supplies the water to the basin, leads from the shell $e$ to a point at the lower corner of the chamber $a$ in the rear of the discharge-valve $c$.

The closet is provided with a pull-handle and rod, $f$, for opening the supply and discharge valves. This pull $f$ is connected with a lever, $g$, which is pivoted at $g'$, and is provided with an arm, $g^2$, which projects in front of the end of the valve-stem $e'$, so that when the lever is raised by the pull $f$ the arm $g$, striking against the stem $e'$, shall open the supply-valve and admit water to the pipe $d$, whence it passes into the basin. Lever $g$ is provided with a pin, $g^3$, which extends through a segmental slot in the arm of the crank-lever $c^3$, and which, when the lever is raised or lowered, causes the valve $c$ to turn on its journals and to be opened or closed, as the case may be. On the outer end of the lever $g$ is a weight, $g^4$, the purpose of which is to cause the lever $g$ to drop when the pull $f$ is released, and thereby to raise the valve $c$ to its vertical or closed position and to retract the arm $g^2$, so as to permit the closing of the water-supply valve. The water-supply valve is so adjusted as to close slowly enough to permit the requisite quantity of water to pass through the supply-pipe $d$ to the basin after the retraction of the arm $g^2$.

The operation of my improvement is as follows: When it is desired to empty the bowl $a$, the lever $g$ is raised by means of the pull $f$, thereby opening the water-supply valve and turning the discharge-valve from the position shown in Fig. 5 to that shown in Fig. 6, until its edge rests upon the bottom of the shell of the chamber $a'$. When in this position the open mouth of the valve $c$ stands in front of the entire width of the opening $a^3$, below the lower end of the partition $a^2$ and between the side wings, $a^4$, so that all the water from the bowl $a$ rushes directly therefrom into the mouth of the valve $c$, the chamber $a'$ being also drained by the passage of the water around the edges of the valve into and through its mouth. The entire contents of the bowl $a$ and chamber $a'$, which enter the valve $c$, pass therefrom through the open journal $c'$ into the soil-pipe $b$. At the same time the supply of water entering by pipe $d$ in the rear of the valve $c$ drives out from under the valve and into its mouth any paper or other waste matter which may have collected below and back of the valve, and thoroughly cleanses the bottom of the structure. The pull $f$ being then released, the weight $g^4$, acting upon the lever $g$, restores the valve $c$ to its normal position. The supply of water continues to enter through the pipe $d$ until the bowl $a$ and chamber $a'$ are filled to the level of the top of the valve $c$. If an excess of water enters through the pipe $d$, it will run over the upper edge of the valve $c$ into the same and escape by the hollow journal $c'$ into the soil-pipe. The partition $a^2$ extends down into the water a sufficient depth to act as a seal, so that no odors escaping from the soil-pipe $b$ through the open valve $c$ can pass from chamber $a'$ into the apartment from the bowl $a$. If desired, the soil-pipe $b$ may have the usual trap formed by an S-shaped casting or pipe. When the valve $c$ is turned into a discharging position, the fall of the water in the chamber $a'$ causes a partial vacuum to be formed therein, which, as soon as the water falls below the edge of the partition or trap plate $a^2$, induces a strong current of air from the bowl $a$ into the valve $c$, which effect is further aided by the rapid downward rush of the water into the soil-pipe, so that while the trap is open the odors from the basin will be drawn inward instead of escaping out into the room. As soon as the water rises to the lower edge of the partition $a^2$, the trap is again established. A packing, $c^4$, of any suitable material, is placed between the shell of the chamber $a'$ and the hollow journal $c'$ of the valve $c$, to make a water-tight joint, so as to prevent the water in the bowl $a$ from wasting at that point.

In the modification shown on Sheet 2 the valve $c$ is turned around, so that it receives the water from the bowl $a$ through the hollow journal $c'$ and discharges it from the mouth of the valve. In this instance the supply-pipe $d$ discharges directly into the bowl $a$, instead of into the chamber $a'$, as in the first instance, there being no necessity for washing out the refuse matter from under the valve, as in this instance it cannot obtain a lodgment there. It will be noticed by the section shown in Fig. 11 that the valve discharges from the lowest point of the structure directly into the mouth of the soil-pipe $b$. In this arrangement the inclined side of the valve $c$ is still the discharging side, and the air-tight valve-chamber $a'$ is also used, so that the advantages recited are preserved. The quick action of the valve in both instances allows the incoming fresh water to seal the closet before the contents of the bowl have escaped from the sewer-pipe, thus trapping in the chamber $a'$ bad air which is drawn in from the bowl and seat by the partial vacuum. This partial vacuum is created by the falling of the water in the chamber $a'$ during the time the sewer-pipe is filled with water. Its action I have denominated an "inspiratory" one.

I do not make any claim for the construction of the devices for operating the discharge and supply valves, as they are of a common form, and also because they may be modified in many ways. This closet may be operated from an overhead tank provided with a suitable float or other means of discharging and regulating the quantity of water into the bowl, and in that case the valve $c$ may be operated by the same lever or cord by which the water is admitted from such elevated tank, as will be readily understood. Many constructions of these devices thus disclaimed are known to those skilled in the art, and are applicable without change to use with my improved closet.

My improvement is remarkably cheap and simple in construction, is not liable to get out of order, and is very efficient in use.

What I claim as my invention, and desire to secure by Letters Patent, is—

1. In that class of water-closets wherein the discharge of the bowl is through an oscillating elbow valve or bucket, the combination, with the bowl and its soil-pipe, of an oscillating bucket-valve having a hollow axis and flaring body, the tipping side of which stands at less than a right angle to the horizon when the bucket is in a vertical plane, substantially as and for the purposes specified.

2. In a water-closet wherein the disc of the bowl is through an oscillating elbow valve or bucket, the combination, with the bowl and its soil-pipe, of an intermediate air-tight bucket-chamber which communicates with the bowl below the "standing-water" line, and an oscillating bucket having a hollow journal and arranged in said bucket-chamber, substantially as and for the purposes specified.

3. In a water-closet wherein the discharge of the bowl is through an oscillating elbow valve or bucket, the combination, with the bowl and soil-pipe, of an intermediate bucket-chamber, an oscillating bucket having a hollow journal, through which it discharges, and a water-supply pipe which discharges into the valve-chamber at a point back of the oscillating bucket, substantially as and for the purposes specified.

4. In a water-closet, the combination, with a bowl and its soil-pipe, of an intermediate air-tight valve-chamber, which communicates with the bowl at or near the bottom thereof, an oscillating bucket having a hollow axis, through which it discharges, and a flaring body, said bucket arranged to vibrate within the valve-chamber and its flaring side being next the bowl port or opening, and a water-supply pipe which delivers into the valve-chamber at a point back of the oscillating bucket and distant from the bowl, substantially as and for the purposes specified.

In testimony whereof I have hereunto set my hand this 24th day of December, A. D. 1884.

HARRY J. BAILEY.

Witnesses:
W. B. CORWIN,
THOMAS B. KERR.